(12) United States Patent
Kauffman

(10) Patent No.: US 6,363,857 B1
(45) Date of Patent: Apr. 2, 2002

(54) TRANSPORTATION SYSTEM

(76) Inventor: John Kauffman, 1902 E. Main, Canon City, CO (US) 81212

( * ) Notice: Subject to any disclaimer, the term of this patent is extended or adjusted under 35 U.S.C. 154(b) by 0 days.

(21) Appl. No.: 09/589,569

(22) Filed: Jun. 7, 2000

(51) Int. Cl.[7] .......................... B60L 13/04; B60L 13/10; B60L 13/08
(52) U.S. Cl. ................... 104/88.01; 104/281; 104/290; 104/124
(58) Field of Search ............................. 104/88.01, 281, 104/283, 284, 95, 89, 282, 290, 292, 124

(56) References Cited

U.S. PATENT DOCUMENTS

| | | |
|---|---|---|
| 3,225,704 A | 12/1965 | Gilvar et al. |
| 3,896,737 A | 7/1975 | Miericke |
| 3,933,258 A | 1/1976 | Forsyth et al. |
| 4,030,422 A | 6/1977 | Pasquan |
| 4,397,496 A | 8/1983 | Drygas, III |
| 4,690,064 A | 9/1987 | Owen |
| 5,146,853 A | 9/1992 | Suppes |
| 5,706,735 A | 1/1998 | Lund |
| 5,732,636 A | 3/1998 | Wang et al. |
| 5,775,227 A | 7/1998 | Mullen |
| 5,797,330 A | 8/1998 | Li |

FOREIGN PATENT DOCUMENTS

| | | |
|---|---|---|
| DE | WO 92/04218 | 3/1992 |
| JP | 2-101904 | 4/1990 |

*Primary Examiner*—Joseph D. Pape
*Assistant Examiner*—Greg Blankenship
(74) *Attorney, Agent, or Firm*—Linda Flewellen Gould

(57) ABSTRACT

A novel transportation system enables passengers to travel at high speeds relative to automobile traffic, while permitting each passenger to individually select his destination, commence travel whenever a transporter is available, and travel with or without his own automobile. The transportation system includes a system of guideways connecting various stations, so that a passenger can travel from an origination station, across guideways, to a destination station of choice. Each guideway consists of parallel tracks supporting support magnets. Each transporter is capable of holding one or more passengers or a single vehicle, with or without passengers. The transporters have horizontally extending supports with transporter support magnets. The transporter support magnets are positioned above the support magnets of the guideways, and have a polarity the same as that of the guideway support magnets, so that the transporter support magnets effectively glide over the guideway support magnets as the transporter is propelled. Switching from one guideway to another is accomplished by extending or retracting the horizontally extending supports to cause the transporter support magnets to be re-positioned over support magnets of guideways with different width tracks, at intersections between guideways. The transporters can be designed in a variety of ways and equipped with numerous amenities.

15 Claims, 6 Drawing Sheets

FIG −1

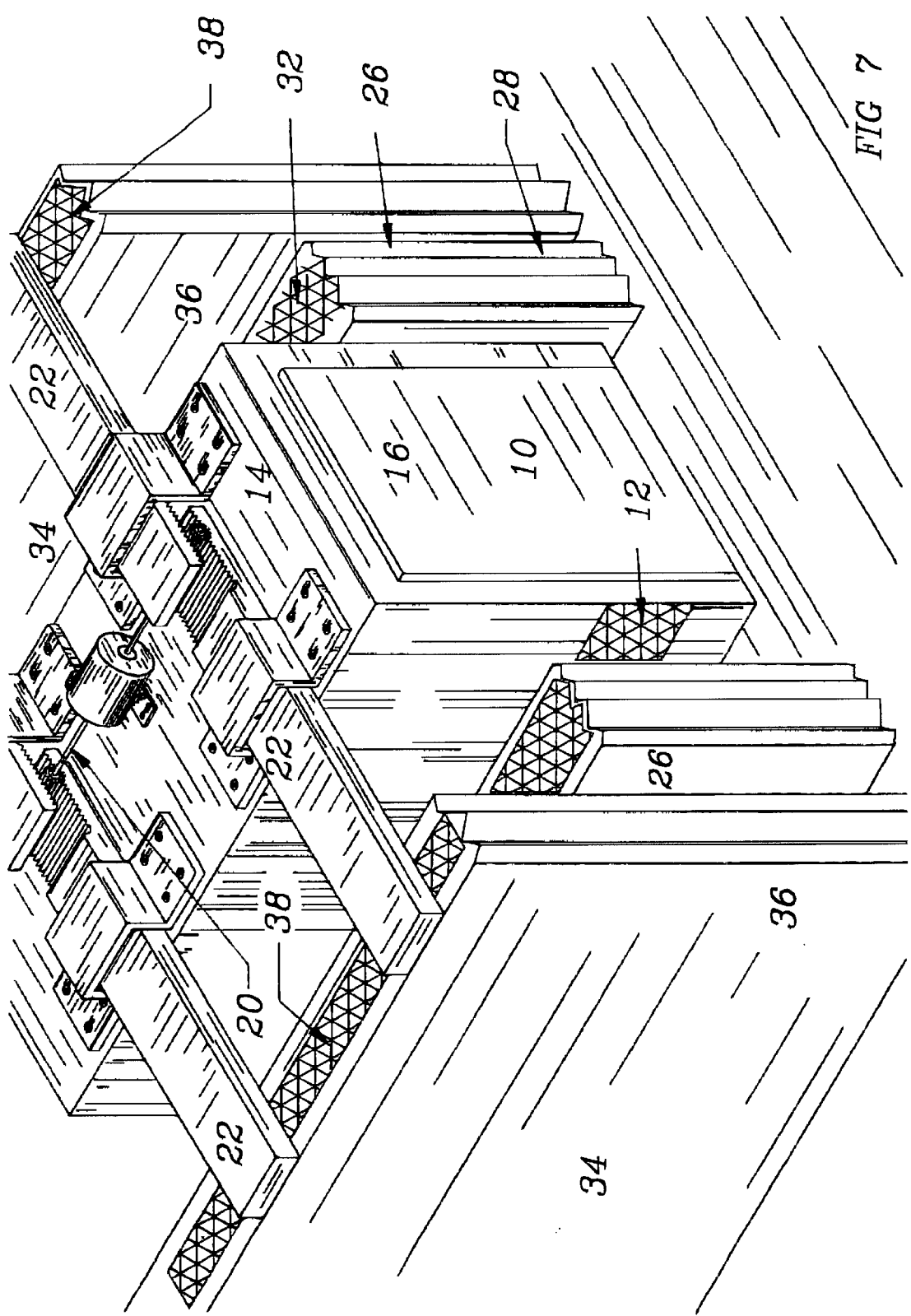

TRANSPORTATION SYSTEM

1.0 BACKGROUND OF THE INVENTION

1.1 Technical Field

This invention pertains to a transportation system capable of moving passengers, vehicles, or both at speeds significantly greater than possible with automobile travel, while allowing each passenger to individually determine that passenger's destination from a potentially large set of possible locations.

1.2 Background Art

Intra-continental travelers can typically choose to travel by automobile, truck, train, or airplane. Each option has its own set of benefits and disadvantages. For example, travel by automobile or truck has the advantage of the traveler having no external restrictions as to departure time or choice of destination, as any person with access to a vehicle can choose to leave on a trip at any time, and route the trip to any destination which is accessible by a road. Vehicle transportation has the further advantage of allowing the traveler to utilize that vehicle for further transportation at the point of destination. On the other hand, vehicular transportation has the disadvantage of being relatively slow, when compared to airplane travel or high-speed rail transportation.

Travel by airplane or high-speed train has the advantage of moving passengers at relatively high speeds, resulting in reaching a destination more quickly than possible by car or truck. However, passengers are restricted as to departure time, and thus arrival time, as they must select from commercial airplane or train schedules. For the same reason, the set of possible destinations is limited. Further, once arriving at a selected destination by airplane or train, the traveler does not have access to his own vehicle, as would be the case if that vehicle had been driven.

Travelers would be well-served by a transportation system which was faster than vehicular travel, but which did not require limited arrival and departure times which must conform to filling a mass transportation airplane or train with multiple passengers. Furthermore, travelers would welcome a transportation system which permitted a passenger to take his own automobile with him, for use at a point of destination, or for traveling further than the destination made available by the transportation system.

The invention described herein contemplates providing these advantages to travelers by a if transportation system based on magnetic levitation. Magnetic levitation systems are known in the prior art, such as the systems described in PCT Patent WO 92/04218 and U.S. Pat. No. 5,732,636 to Wang et al., U.S. Pat. No. 5,146,853 to Suppes, and U.S. Pat. No. 3,896,737 to Miericke. It has been demonstrated in trials of mag-lev systems that speeds of 300 miles per hour and greater can be achieved. However, currently available technology does not provide for mag-lev transportation of automotive vehicles to individually chosen destinations, which is made possible by the claimed invention.

Other mass transportation systems are known in the prior art, each with particular advantages. For example, the electric vehicle transport system of U.S. Pat. No. 5,775,227 to Mullen permits electric cars to be loaded onto individual transport modules and moved along a system of guideways to a destination station, but not at the high speeds which can be achieved with a magnetic levitation system. U.S. Pat. No. 3,933,258 to Forsyth et al. and U.S. Pat. No. 4,397,496 to Drygass disclose transporter vehicles for moving multiple cars at relatively slow speeds. U.S. Pat. No. 5,706,735 to Lund teaches a system for automated transport of automobiles, via electrified guideways, but at speeds not much greater than 100 miles per hour (col. 36). U.S. Pat. No. 3,225,704 to Gilvar et al. discloses a system with individually controlled vehicles, but which is not capable of transporting standard automobiles.

Other mass transportation systems in the prior art include monorail systems described in U.S. Pat. No. 4,690,064 to Owen and U.S. Pat. No. 5,797,330 to Li, and a railway system for guided vehicles disclosed in U.S. Pat. No. 4,030,422 to Pasquan. These transportation systems efficiently move individual passengers but do not expressly contemplate moving automobiles or trucks.

Although each of these transportation systems is well-suited for its intended purpose, none provides a high speed manner to transport both passengers and automotive vehicles to individually selected destinations.

2. DISCLOSURE OF THE INVENTION

2.1 Summary of the Invention

An object of this invention is to provide a new and useful high speed transportation system.

Another object of this invention is to provide such a transportation system which can carry individual passengers, automotive vehicles, or both.

Yet another object of this invention is to provide such a transportation system which allows each passenger, with or without an automobile, to select an individual destination on demand.

Yet another object of this invention is to provide such a transportation system in which each passenger can travel within the privacy and customary comfort of that passenger's own automotive vehicle, allowing the passenger to utilize that vehicle beyond the destination achieved on the transportation system.

The transportation system claimed herein includes a transportation network of stations and guideways connecting the stations to one another. Each guideway consists of parallel tracks. Individual transporters move between the parallel tracks from one station to another. The design and functionality of each transporter can vary significantly, as long as each transporter is of a size that fits between the parallel tracks. Each transporter is conveniently large enough to receive an automobile or truck, which vehicle can drive into an open door of the transporter at a dock in an origination station. It is possible to construct transporters and guideways which would accommodate large trucks and semi-trailers, but it is contemplated that the most efficient use of the transportation system would accommodate primarily small trucks and automobiles. Once the transporter has traveled, at speeds of approximately 300 miles per hour, across the guideways to a destination station, the vehicle is driven off the transporter onto a dock, and from there utilized in a typical fashion at the destination location or on roads leading from the destination station to other locales.

Most transporters have a body of sufficient size to receive and enclose a vehicle, but some transporters could be designed to provide seating for passengers traveling without vehicles. Similarly, transporters could be constructed to accommodate freight shipments, which could be moved into the transporter by forklift or dolly, without the necessity of including a propulsion vehicle.

Two horizontally extending supports extend in opposite directions from the body, and a transporter support magnet is supported by each horizontally extending support. Magnets supported by the guideways have the same polarity as the transporter support magnets. Thus, when the transporter support magnets are positioned above the guideway support magnets, the transporter is allowed to effectively glide along the guideways, without physically contacting the guideways. To enhance stability, it is preferable to arrange the horizontally extending supports above the center of gravity of the transporter body.

A myriad of possible designs, configurations, and possible amenities can be included with any individual transporter. For example, each transporter could include a permanent lavatory, with hot and cold running water, which is accessible by passengers riding in that transporter or riding in a vehicle loaded onto that transporter. Each such lavatory could be made fire-proof to provide a safe haven for passengers on that transporter in the event of a fire or other catastrophe, or a separate fire-proof compartment could be provided for this purpose.

Transporters designed to hold automobiles or trucks include a balance and stability system to enable the vehicle to be safely positioned and held in position within the transporter as the transporter moves across the transportation system. When the vehicle is driven into the transporter, a weight sensor determines the weight of the vehicle and how that weight is distributed. The balance and stability system then communicates a message to the driver of the vehicle, by any number of commonly known methods, indicating the direction to which the vehicle should be guided within the transporter to cause the vehicle to be properly aligned within the transporter to most stably distribute the weight of the vehicle. In this manner, the vehicle is directed to a most stable position within the transporter.

Once the vehicle has been positioned appropriately, a stabilization means is utilized to hold the vehicle in the most stable position during transportation over the transportation system. The stabilization means can efficiently consist of chocks which are automatically moved into place to keep the tires of the vehicle from moving. Various means of placing the chocks may be utilized, including hydraulic methods or gears. For example, the position of the chocks could be adjusted by a rotating belt to which the chocks are connected, moving the chocks to a variety of possible positions along the floor in the front of the transporter. Once the front chocks are moved to a position in front of the front wheels of the vehicle, a second set of chocks automatically raise from the floor of the transporter behind the car, and conveniently move forward to rest against the rear wheels, holding the vehicle securely in place.

Each transporter is individually routable, on demand, to any station in the transportation network. Each transporter includes a routing controller, which identifies the desired destination for the passenger or passengers of that transporter, by reading such information from a key, ticket, or other license which is obtained by the individual passenger. The routing controller of the transporter directs the transporter to accelerate along a station guideway leading from the origination station to a main guideway, where speeds in excess of 200 miles per hour are maintained by multiple transporters being propelled along the main guideway. The routing controller queries the main guideway to detect a space between transporters already moving along the main guideway sufficient to accommodate the transporter on which that routing controller is located. For transporters moving at approximately 300 miles per hour, an available space of approximately one hundred ten to two hundred feet is appropriate. Obviously, the smaller the space between transporters, the more transporters that can move along the main guideway at a given time. Having detected such an available space, the routing controller directs that transporter to commence moving at a time calculated to place the transporter onto the main guideway in the space between the moving transporters.

The routing controller continues to direct the transporter from one guideway to another so as to most efficiently arrive at a destination station identified by the passenger's key. A station guideway connecting the main guideway on which the transporter is propelled to the destination station is used to decelerate from speeds of approximately 300 miles per hour along the main guideway, to stop at a dock at the destination station.

The transportation system includes multiple guideways, along which each individual transporter may be propelled. The main guideway has a distance between tracks, or main guideway gauge, which is sufficient to accommodate transporters moving along the guideway between its tracks. At each intersection of two guideways, one set of guideway tracks has the main guideway gauge and the second, intersecting set of tracks are constructed outside and contiguous to the main guideway. For example, a station guideway connecting a station with a main guideway conveniently has a station guideway gauge, or distance between guideway tracks, which is sufficient to allow the main guideway tracks intersecting that station guideway to be physically located inside the station guideway tracks. Thus, transporters moving along the main guideway pass through the intersection without encountering the station guideway tracks, except for transporters which are individually routed onto the station guideway at the intersection.

In an alternative embodiment, the main guideway could be wider than the station guideway, so that the station guideway has the more narrow tracks fitting within the main guideway tracks in an intersection. It is advantageous to build the station guideways of a wider gauge than the main guideway, however, since the transporters are more stable with the horizontally extending supports in a retracted position, as opposed to extended to move along wider gauge track. Thus, since transporters typically move at an average speed which is faster on a main guideway than on a station guideway, main guideways typically utilize a more narrow gauge than the station guideways.

When an individual transporter is ready to move from an origination station to the main guideway, the routing controller causes the transporter to move along the origination station guideway where it accelerates to attain the speed of transporters moving on the main guideway. Each station guideway is built with a sufficient distance between the station and the intersection with the main guideway to allow transporters moving along that station guideway to accelerate to main guideway speeds, without causing discomfort to individual passengers in the transporters being accelerated. In a preferred embodiment, the station guideway is constructed above the main guideway, ultimately sloping downward to intersect the main guideway. Thus, a transporter which has accelerated along an origination station guideway is lowered onto the main guideway at the intersection of the main guideway and the origination station guideway.

Station guideways have a sufficiently wide gauge to allow transporters on the main guideway to pass between the station guideway tracks in areas in which the main guideway intersects with the station guideways. The intersection of each main guideway and each station guideway consists of an interval in which the station guideway tracks lie along the outside and level with the main guideway. The support magnets of the intersecting guideways are contiguous throughout the intersection. When a transporter moves from the station guideway to the main guideway, the routing controller of that transporter directs the horizontally extending supports of that transporter to retract, causing the transporter support magnets to engage the main guideway support magnets as the transporter moves along the intersection. Similarly, when the routing controller determines that the individual transporter should move from a main guideway to a wider gauge destination station guideway, the routing controller causes the transporter horizontally extending supports to extend outwardly from the transporter, so that the transporter support magnets are physically located above and engage the support magnets of the destination station guideway. When the routing controller determines that the individual transporter should move from a main guideway to a secondary guideway connecting two main guideways, the routing controller extends or retracts the transporter horizontally extending supports to cause the transporter support magnets to be physically located above the support magnets of the appropriate new guideway. Guideways intersect for an appropriate distance which allows the horizontally extending supports to be extended or retracted from a position with the support magnets above the guideway along which the transporter was traveling, to a position with the support magnets above the guideway to which the transporter is moving, at the high speeds at which the transporter is moving.

Because the transporter support magnets can be extended and retracted to be positioned over guideway support magnets of varying widths, only one pair of support magnets is necessary for each transporter. Alternatively, multiple support magnets covering an area the size of the guideway support magnets on each separate guideway track can be used, with the multiple support magnets aligned in a row in the same location as a single support magnet. A transporter with support magnets of 250 pounds on each transporter support can efficiently carry a ten thousand pound load. In contrast, multiple transporter support magnets could be aligned to glide over guideway support magnets of varying widths. However, using multiple transporter support magnets spanning an area over varying width tracks would significantly increase the weight of each transporter, and thus increase the force required to move the transporter. Transporters with a single pair of support magnets, or multiple support magnets aligned in a row, each with a width comparable to a single pair of guideway support magnets, as claimed herein, weigh less than a transporter with longer or multiple support magnets. The claimed transporter can thus be propelled faster than a heavier transporter, by exertion of the same force.

While guideways intersect for a distance sufficient to allow transporter support magnets to be moved from one guideway to a wider or narrower guideway intersecting the guideway along which the transporter was previously moving, the two guideways can diverge from one another after that distance. In a preferred embodiment, each station guideway diverges by raising above the main guideway which is intersected by that station guideway. In this manner, a transporter decelerating from the main guideway is effectively lifted above the main guideway on a destination station guideway, allowing the transporter to decelerate as it moves toward the destination station without slowing the traffic of other transporters along the main guideway. It is contemplated that main guideways may be constructed under ground, while station guideways run from the underground main guideways to stations located above ground.

To cause the horizontally extending supports of a transporter to extend or retract, the routing controller directs a rotatable shaft which cooperates with the horizontally extending supports to rotate one direction or the other. When the routing controller causes the rotatable shaft to rotate in an extension direction, the horizontally extending supports are moved outward from the transporter, causing the transporter support magnets to be positioned above guideway support magnets on a relatively wide guideway, such as a station guideway. When the routing controller causes the rotatable shaft to rotate in a direction opposite the extension direction, the horizontally extending supports are moved inward toward the transporter, causing the transporter support magnets to be positioned above support magnets on a relatively narrow guideway, such as a main guideway. It is contemplated that various width guideways could be built, with the horizontally extending supports having numerous possible positions, each accessible by rotating the rotatable shaft a particular number of degrees in a chosen direction, allowing the transporter support magnets to be positioned above guideway support magnets of a variety of guideway track gauges.

The transporters can be propelled along the guideways in a number of ways. A particularly efficient embodiment utilizes linear induction motors to move each transporter. The active element of each linear induction motor, comprising a coil, is connected to the guideways, and provides electrical power from a remote source. The passive element of each linear induction motor is conveniently attached to each transporter, so that the transporter portion of the linear induction motor fits into and is propelled along by the guideway active element.

Each transporter is held in an appropriate alignment between the tracks of a guideway by alignment magnets located on each transporter, positioned between alignment magnets of the same polarity along each guideway. In this manner, the transporter is pushed into an appropriate position between the guideway tracks by the magnetic force between the transporter alignment magnets and the guideway alignment magnets.

Empty transporters can easily be routed from one station to another, to pick up passengers, freight, or vehicles at an origination station of high demand. Thus, multiple empty transporters can be sent along the main guideways at periods of low demand, to arrive at and be loaded at origination stations with relatively high traffic.

The novel transportation system described herein achieves the objectives of providing a method of high speed travel, in which each passenger can travel with or without a vehicle to be utilized at the destination, and in which each passenger can individually select a destination to which that passenger's transporter is routed, commencing travel at any time a transporter is available. The transportation system achieves these goals while using less fuel per mile traveled than commercial airline transportation. Furthermore, the transportation system claimed herein has environmental benefits, as it results in less exhaust per mile traveled than contemporary vehicle traffic.

The novel features that are considered characteristic of the invention are set forth with particularity in the claims. The invention itself, both as to its construction and its method of operation, together with additional objects and advantages thereof, will best be understood from the description of specific embodiments which follows, when read in conjunction with the accompanying drawings.

2.2 BRIEF DESCRIPTION OF THE DRAWINGS

FIG. 7 is a perspective view of a transporter being moved along a station guideway, at an intersection of two guideways, according to the present invention.

2.3 DETAILED DESCRIPTION OF THE PREFERRED EMBODIMENT

The present invention concerns a novel transportation system. In the following description, numerous specific details are set forth in order to provide a thorough understanding of the present invention. It will be obvious, however, to one skilled in the art that the present invention may be practiced without these specific details. Some well-known methods and structures have not been set forth in order not to unnecessarily obscure the description of the present invention.

Figure 4:
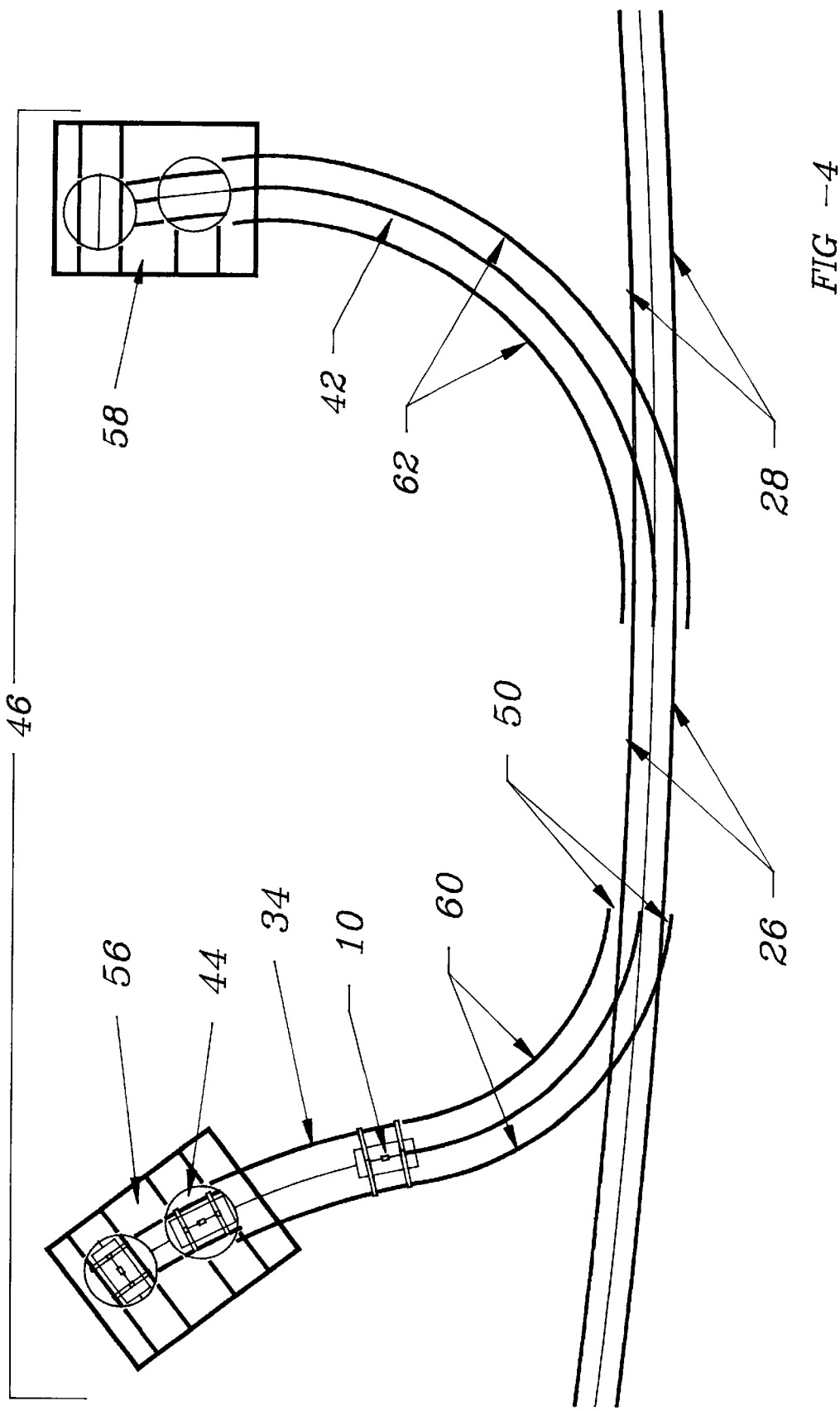
FIG. 4 is a diagram of a transportation system with multiple guideways and stations, according to the present invention.

As best shown in FIG. 4, the transportation system claimed herein includes a network 46 of guideways 26,34 and stations 44. Individual transporters 10 are propelled along the guideways 26,34 to move from an origination station 56 to a destination station 58 of the passenger's choice. Although the transportation system enables travel at relatively high speeds compared to vehicle traffic, the passenger has the benefit of choosing to travel with his own vehicle, at any time a transporter is available, to a destination of choice.

A variety of transporter designs are possible. In the preferred embodiment shown in FIG. 1, a transporter 10 has a body 14 of sufficient size to surround a vehicle 64, such as a car or light weight truck, and carry that vehicle. The vehicle 64 can enter the transporter 10 through a door 16. Freight could also be loaded into a transporter 10, with or without a vehicle. Alternatively, a transporter 10 may be designed for passengers to sit on seats equipped with safety belts arranged in the interior of the transporter body 14. Although the exterior design of all transporters is similar because of structural requirements described below, the interior of different transporters may vary significantly, with possible inclusions such as a lavatory, vending machine, or sleeping area (not shown).

Figure 1:
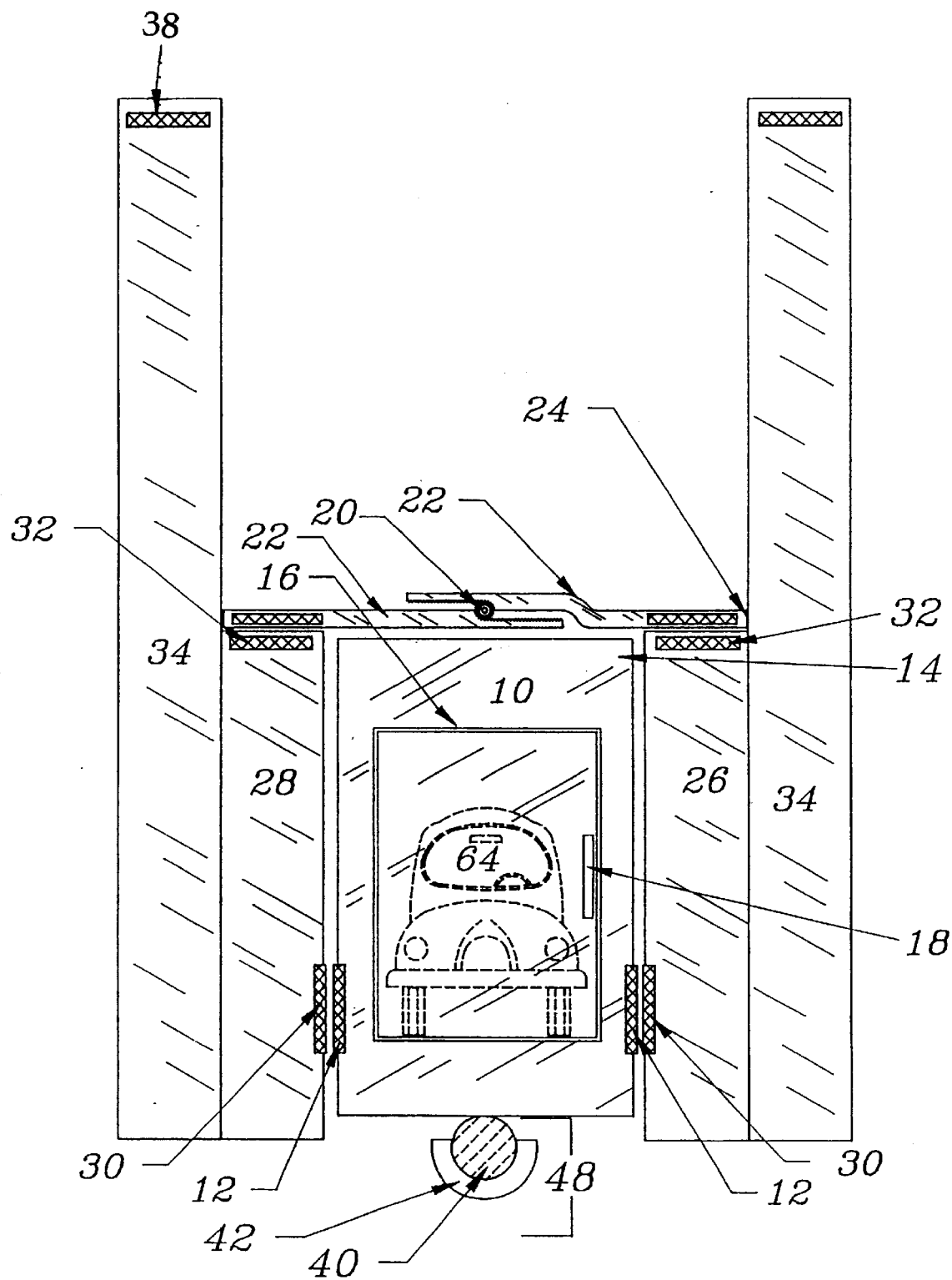
FIG. 1 is a front view of a transporter traveling along a main guideway, which main guideway is positioned between tracks of a station guideway, according to the present invention.
Figure 2:
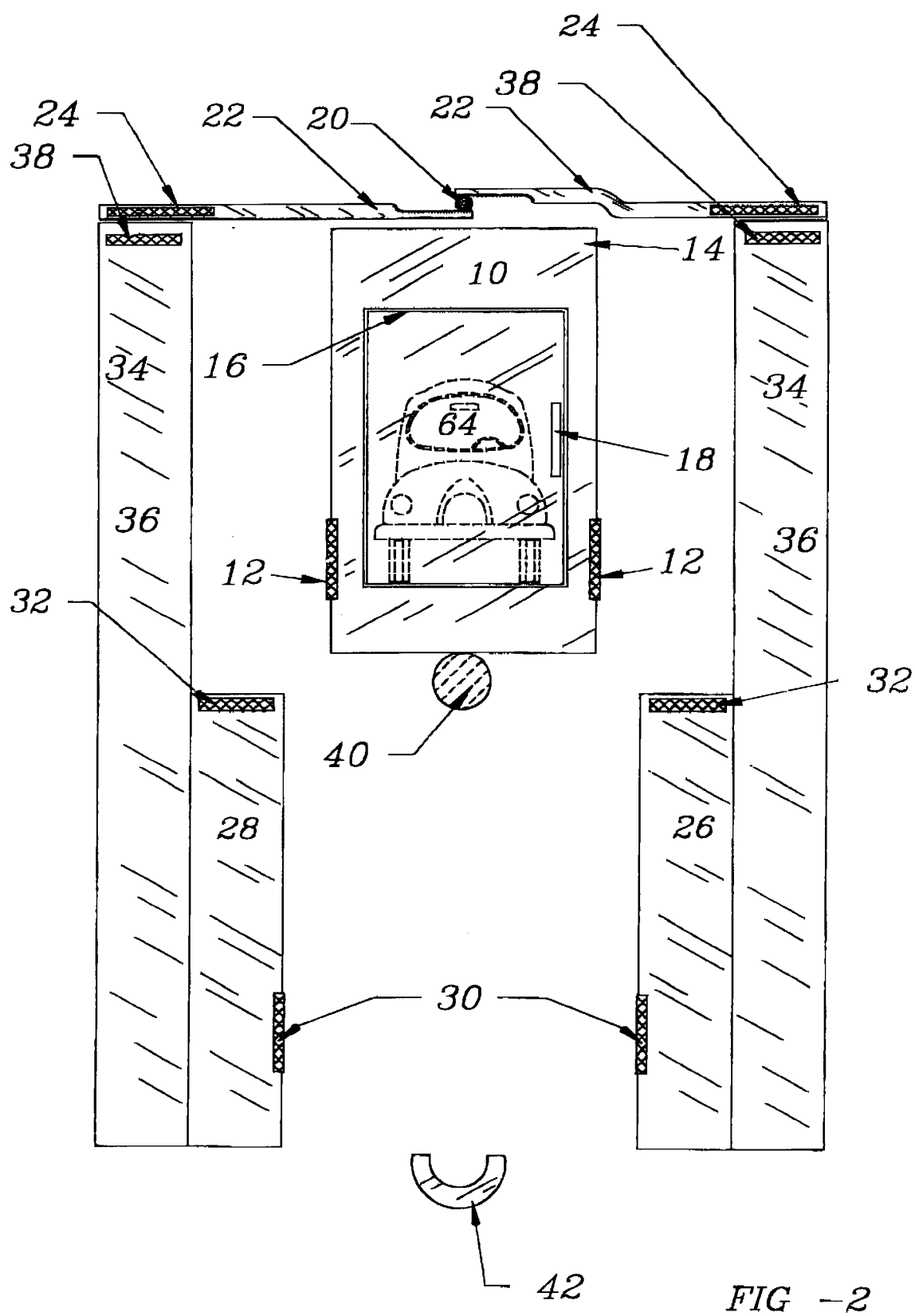
FIG. 2 is a front view of a transporter traveling along a station guideway, which station guideway is positioned outside the tracks of a main guideway, according to the present invention.
Figure 5:
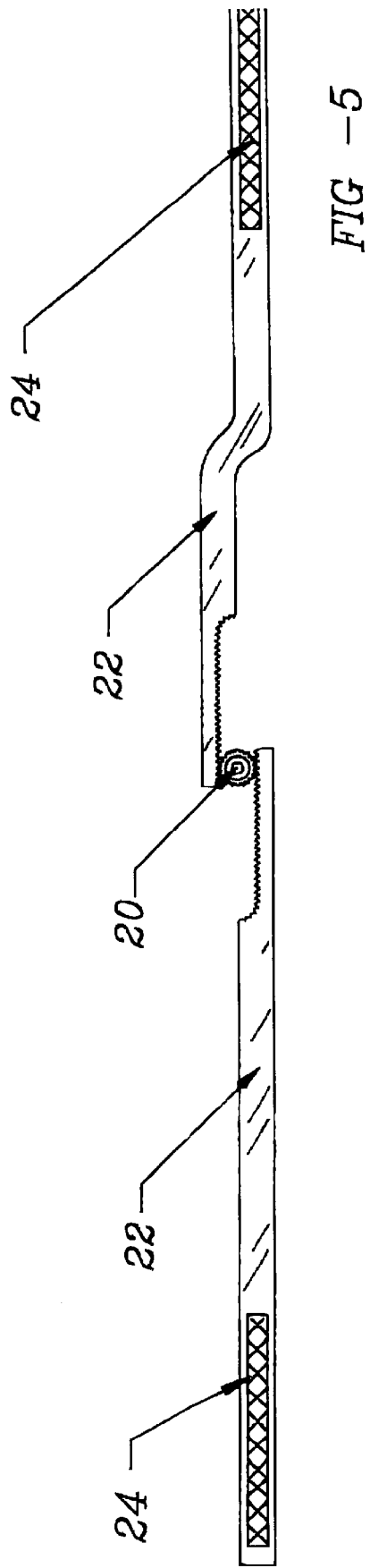
FIG. 5 is a front view of a rotatable shaft controlling horizontally extending supports of a transporter in an extended position, according to the present invention.
Figure 6:
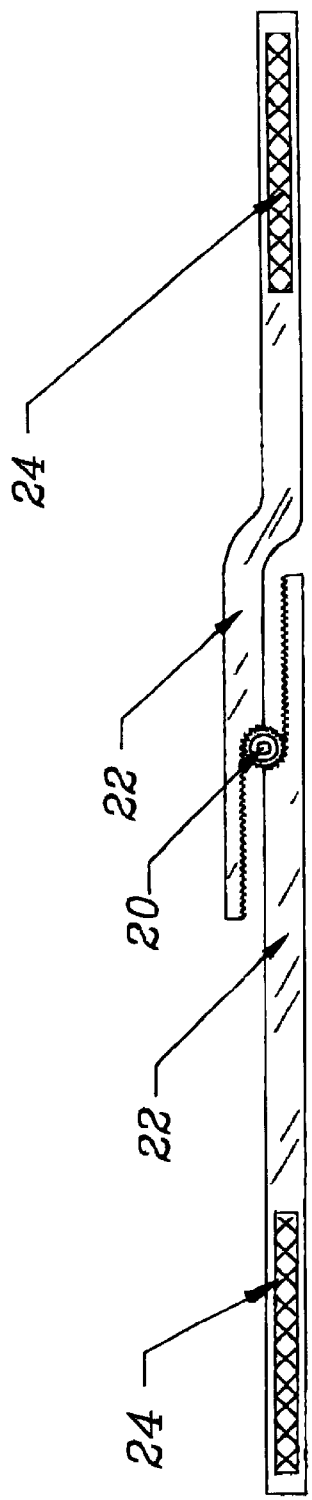
FIG. 6 is a front view of a rotatable shaft controlling horizontally extending supports of a transporter in a retracted position, according to the present invention.

As can be seen in FIGS. 1 and 2, two horizontally extending supports 22 extend in opposite directions from the transporter body 14. At least one transporter support magnet 24 is supported by each horizontally extending support 22. The horizontally extending supports 22 can be extended in opposite directions to an extended position shown in FIG. 2, or retracted to a retracted position shown in FIG. 1. Extension and retraction of the supports 22 is advantageously accomplished by rotating a rotatable shaft 20 which is mounted to the transporter body 14. As best shown in FIG. 5, rotation of the rotatable shaft 20 in an extension direction moves the supports 22 outward in opposite directions. Rotation of the shaft 20 in a retraction direction moves the supports 22 inward as shown in FIG. 6. Thus, rotation of the rotatable shaft 20 controls the placement of the transporter support magnets 24, so that the support magnets 24 can be moved to particular positions on demand.

The transporters 10 can be most stably positioned by arranging the horizontally extending supports 22 above the center of gravity of the transporter body. Thus, it is most convenient to locate the rotatable shaft 20 on top of the transporter body 14, cooperating with supports 22 which extend and retract above the transporter body 14.

Movement of each transporter along the guideways can be accomplished by a number of commonly known propulsion techniques. For example, each transporter can be efficiently propelled along guideways 26, 34 by means of a linear induction motor 48, as shown in FIG. 1. The active element 42 of the linear induction motor typically consists of a coil which is built into the guideways 26, 34, as shown in FIGS. 1 and 4. Electrical current is provided to the active element 42 to cause the passive element 40 to be moved along the active element 42. The passive element 40 of the linear induction motor is conveniently built into the transporter 10, in a position which allows the passive element 40 to move within the active element 42. Linear induction motors can efficiently propel transporters 10 carrying approximately five tons along main guideways 26 at speeds of 300 miles per hour, without creating the exhaust typically associated with gas powered engines.

Figure 3:
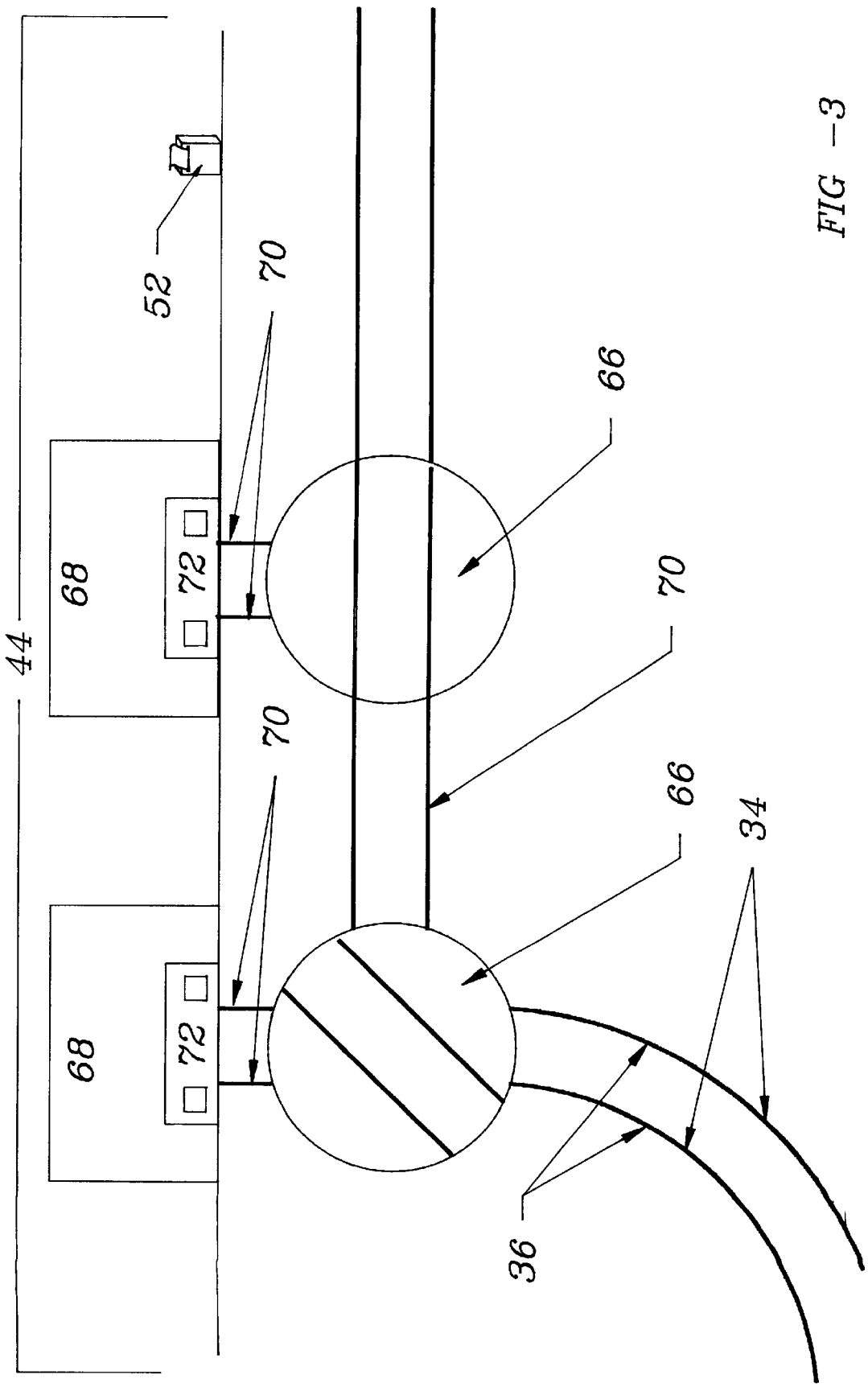
FIG. 3 is a perspective view of a docking station of the transportation network of the present invention.

When a passenger, freight, or vehicle to be moved along the transportation system arrives at a docking station 44, as shown in FIG. 3, a key is obtained from a key generator 52, designating the selected destination for that load. Obviously, key generators can advantageously collect payment for the trip to be conducted over the transportation network, which fare may depend on the destination selected and distance to be traveled. The load to be carried is then assigned to a transporter 10 which is temporarily housed in a docking station shed 68. The key obtained from the key generator 52 is submitted to the routing controller 18 of the transporter 10, to identify the destination for the trip across the transportation network.

When a transporter 10 is loaded, a balance and stability system 72 is used to position the load within the transporter and to secure the load in a most safe position for transportation. For example, if the transporter 10 is carrying a vehicle 64, a weight sensor determines the weight of the vehicle 64 and how that weight is distributed. A message is then transmitted by the balance and stability system 72 to the driver of the vehicle 64 to communicate which way the vehicle 64 should be driven and how far it should be moved to attain a position within the transporter 10 which is most stable. Once the vehicle 64 has been moved into a most stable position, a variety of commonly known methods may be used to secure the vehicle 64 in that position.

Once the load has been secured in the transporter 10, the transporter 10 is moved within the docking station 44 along tracks 70, as best shown in FIG. 3. Turn tables 66 are efficiently used to orient the transporter 10 onto whichever tracks 70 will lead the transporter 10 from its shed 68 to the station guideway 34. The routing controller 18 of the transporter 10 serves a number of functions. The routing controller 18 queries the main guideway 26 to detect a space between transporters already moving along the main guideway 26 which space is sufficient to accommodate the transporter 10 which is waiting at the origination station 56. Once an available space has been identified, the routing controller 18 calculates the time required to accelerate from the origination station 56, across the origination station guideway 60, to an intersection 50 with the main guideway 26. The routing controller 18 then directs the transporter 10 to engage the propulsion mechanism 48 to initiate movement along the origination station guideway 60 at the appropriate time to enable the transporter 10 to accelerate along the station guideway 60 so as to arrive at the intersection 50 within the available space between transporters 10 moving along the main guideway 26.

When the transporter 10 arrives at the intersection 50, the routing controller 18 directs the rotatable shaft 20 to move the horizontally extending supports 22 to a position which aligns the transporter support magnets 24 on the supports 22 directly above the guideway support magnets 32 on the main guideway 26. The main guideway 26 and the origination station guideway 60 are contiguous throughout the intersection 50, allowing the transporter 10 to move at the high speeds at which all transporters 10 are moving along the main guideway 26, while the horizontally extending supports 22 move smoothly to a new position with the transporter support magnets 24 above the main guideway support magnets 32, as shown in FIG. 1, from the position in which the transporter support magnets 24 were above the origination station guideway support magnets 38, as shown in FIGS. 2 and 7.

One or more transporter support magnets 24 are supported on each horizontally extending support 22, covering an area which is substantially similar in size to the surface area of guideway magnets 32,38. Because the transporter supports 22 can be moved by the rotatable shaft 20, it is not necessary for each transporter support 22 to carry magnets 24 which have a surface area sufficient to glide above both a narrow gauge main guideway 26 and a wider gauge station guideway 34. The same transporter support magnet or magnets 24 are used to glide above tracks 28, 36 of various gauges. As a result, it is not necessary to provide transporter support magnets 24 covering an area which spans tracks of various gauges, which would significantly increase the weight of each transporter 10.

In the preferred embodiment shown in FIGS. 1 and 2, the station guideway tracks 36 lie outside and level with the main guideway tracks 28 through each intersection 50. After an interval sufficient to allow a transporter 10 entering the main guideway 26 to reposition its transporter supports 22 so that the transporter support magnets 24 are directly above the main guideway support magnets 32, the origination station guideway 60 terminates. The transporter 10 continues to move along the main guideway 26, and may be directed by its routing controller 18 from one main guideway 26 to another to most directly move along the transportation network to the desired destination. Any change from one guideway to another is accomplished by rotating the rotatable shaft 20 to move the transporter horizontally extending supports 22 to align the transporter support magnets 24 over the guideway support magnets 32 of the desired guideway 26. Because the guideway support magnets 32 and the transporter support magnets 24 are of like polarity, the transporter 10 glides above the guideways 26, without physically contacting the guideways 26.

When the transporter 10 approaches the destination station guideway 62 which leads from the main guideway 26 to the destination station 58 indicated by the key which has been submitted to the routing controller 18, the routing controller 18 directs the transporter 10 to exit the main guideway 26 along the destination station guideway 62. An intersection 50 of the main guideway 26 and destination station guideway 62 provides contiguous tracks 28, 36 so that the horizontally extending supports 22 can be directed by the routing controller 18 to move the transporter support magnets 24 from a position over the main guideway support magnets 32 to a position over the destination station support magnets 38, as the transporter 10 moves at the speed of all transporters moving along the main guideway. Once the transporter support magnets 24 are positioned above the destination station support magnets 38, the transporter 10 is moved along the destination station guideway 62 at decreasing speeds, so that the transporter 10 eventually stops at the destination station 58.

In a preferred embodiment shown in FIG. 7, each station guideway 34 runs from a higher altitude at the end of the station guideway 34 which terminates at a docking station 44, to a lower altitude which intersects the main guideway 26. Thus, a transporter accelerates along an origination station guideway 60 as it moves downward, and decelerates along a destination station guideway 62 as it moves upward, with acceleration and deceleration aided by the force of gravity. A transporter 10 approaching or moving away from an intersection 50 of station guideway 34 and main guideway 26 moves above transporters moving along the main guideway 26, as long as that transporter 10 is moving at speeds less than the speed of transporters traveling along the main guideway 26.

Each transporter 10 is held in place between the tracks of each guideway by alignment magnets. The transporter 10 is advantageously equipped with alignment magnets 12 on either side of the transporter body 14. Each guideway track 28, 36 has alignment magnets 30 of like polarity to the transporter alignment magnets 12. In this manner, the transporter 10 is magnetically forced to a position equally spaced between guideway tracks 28, 36.

The novel transportation system has been described in detail with particular reference to preferred embodiments thereof. As will be apparent to those skilled in the art in the light of the accompanying disclosure, many substitutions, modifications, and variations are possible in the practice of the invention without departing from the spirit and scope of the invention.

I claim:

1. A transportation system, comprising:
   a. a transportation network, having a plurality of stations and guideways interconnecting said stations, so that each station can be reached directly or indirectly from each other station across said guideways;
   b. a plurality of transporters suitable for operation on the guideways of the network, where each transporter is individually routable on demand to a chosen station of the plurality of stations, and where each transporter comprises a transporter body, a routing controller, two horizontally extending supports extending in opposite directions from said transporter body, and at least one transporter support magnet supported by each horizontally extending support;
   c. where said guideways comprise main guideways and station guideways, where each main guideway comprises parallel main guideway tracks, with a distance between said main guideway tracks sufficient to accommodate a transporter body, and where each station guideway comprises parallel station guideway tracks, with a distance between said station guideway tracks sufficient to accommodate the main guideway tracks, and where each station guideway intersects a main guideway at one end, and connects to a station at an opposite end, and where each station guideway rises or moves downward from an intersection with a main guideway to an altitude which is sufficient to cause a transporter moving on the station guideway to not contact a transporter moving along the main guideway;

d. where the horizontally extending supports contact a rotatable shaft mounted on the transporter, so that rotation of the rotatable shaft in an extension direction causes said horizontally extending supports to move in opposite directions extending outward from the transporter, and rotation of the rotatable shaft in an opposite direction causes said horizontally extending supports to move inward towards said transporter; and e. each guideway track having guideway support magnets with like polarity as the transporter support magnets so that each transporter support magnet is positioned above a guideway support magnet.

2. A transportation system according to claim 1, where each transporter is subject to propulsion along the guideways by a linear induction motor, having an active element which is connected to the guideway and a passive element which is attached to the transporter.

3. A transportation system according to claim 2, wherein each transporter moves at speeds greater than 200 miles per hour.

4. A transportation system according to claim 1, where said routing controller can direct said rotatable shaft to rotate in the extension direction so as to extend said horizontally extending supports outward from the transporter, so that the transporter support magnet supported by each horizontally extending support is positioned above a guideway support magnet supported by a station guideway track at an intersection of a main guideway track and a station guideway track which connects the main guideway track to a selected station.

5. A transportation system according to claim 4, where said routing controller can direct said rotatable shaft to rotate opposite the extension direction so as to move said horizontally extending supports inward towards the transporter, so that the transporter support magnet supported by each horizontally extending support is positioned above a guideway support magnet supported by a main guideway track at an intersection of a station guideway track and a main guideway track.

6. A transportation system according to claim 5, further comprising:

a. key generating means for generating a key which designates a desired destination to which a passenger will be transported on the transporter, b. destination identification means by which the routing controller of the transporter identifies the desired destination designated by the key, c. acceleration means for moving the transporter at increasing speeds from an origination station to an intersection with a main guideway along an origination station guideway connecting said origination station and said main guideway, d. support magnet retraction control means by which the routing controller directs the rotatable shaft to rotate opposite the extension direction at the intersection of the origination station guideway track and the main guideway track;

e. support magnet extension control means by which the routing controller directs the rotatable shaft to rotate in the extension direction at an intersection of the main guideway track and a destination station guideway track which connects the main guideway to a destination station at the desired destination; and f. deceleration means for moving the transporter at decreasing speeds from the intersection of the main guideway and the destination station guideway to the desired destination.

7. A transportation system according to claim 6, further comprising:

spacing control means by which the presence of transporters traveling along a main guideway is sensed, an available space between transporters traveling along the main guideway sufficient to accommodate another transporter is determined, and a message is communicated to the routing controller of the transporter to be accelerated into the main guideway establishing a time at which the transporter can enter the main guideway in the available space.

8. A transportation system according to claim 7, where the available space is not required to be greater than one hundred twenty feet.

9. A transportation system according to claim 1, where the horizontally extending supports extend from the transporter at a point above the center of gravity of the transporter.

10. A transportation system according to claim 1, further comprising at least one guideway alignment magnet on each guideway track, and at least one transporter alignment magnet on opposite sides of each transporter of like polarity, positioned so that each transporter is aligned between guideway tracks by said alignment magnets.

11. A transportation system according to claim 1, where each transporter has sufficient size to accommodate a vehicle.

12. A transportation system according to claim 11, each transporter further comprising a balance and stability system, said balance and stability system comprising:

a. weight determining means for determining the weight of a vehicle which has entered into the transporter, b. communication means for communicating to a driver of the vehicle which direction and how far to move the vehicle to cause the vehicle to be in a stable position in which the weight of the vehicle is stably distributed in the transporter body, and c. stabilization means for holding the vehicle in the stable position.

13. A transportation system according to claim 1, each transporter further comprising a lavatory.

14. A transportation system according to claim 1, wherein each transporter is capable of transporting a load weighing ten thousand pounds.

15. A method of moving individual transporters, comprising:

a. building a transportation network, having a plurality of stations and guideways interconnecting said stations, so that each station can be reached directly or indirectly from each other station across said guideways;

b. moving a plurality of transporters on the guideways of the network, where each transporter is individually routable on demand to a station of the plurality of stations, and where each transporter comprises a transporter body, a routing controller, two horizontally extending supports extending in opposite directions from said transporter body, and at least one transporter support magnet supported by each horizontally extending support;

c. where said guideways comprise main guideways and station guideways, where each main guideway comprises parallel main guideway tracks, with a distance between said main guideway tracks sufficient to accommodate a transporter body, and where each station guideway comprises parallel station guideway tracks, with a distance between said station guideway tracks sufficient to accommodate the main guideway tracks, and where each station guideway intersects a main guideway at one end, and connects to a station at an opposite end, and where each station guideway rises or moves downward from an intersection with a main guideway to an altitude which is sufficient to cause a transporter moving on the station guideway to not contact a transporter moving along the main guideway;

d. where the horizontally extending supports contact a rotatable shaft mounted on the transporter, so that rotation of the rotatable shaft in an extension direction causes said horizontally extending supports to move in opposite directions extending outward from the transporter, and rotation of the rotatable shaft in an opposite direction causes said horizontally extending supports to move inward towards said transporter; and e. each guideway track having guideway support magnets with like polarity to the transporter support magnets so that each transporter support magnet is positioned above a guideway support magnet.

* * * * *

UNITED STATES PATENT AND TRADEMARK OFFICE
CERTIFICATE OF CORRECTION

PATENT NO. : 6,363,857 B1
DATED : April 2, 2002
INVENTOR(S) : Bright et al.

It is certified that error appears in the above-identified patent and that said Letters Patent is hereby corrected as shown below:

<u>Title page,</u>
Item [*] Notice, delete the phrase "by 0 days" and insert -- by 68 days --

Signed and Sealed this

Eighteenth Day of May, 2004

JON W. DUDAS
*Acting Director of the United States Patent and Trademark Office*